United States Patent [19]

Lassmann et al.

[11] 4,279,872

[45] Jul. 21, 1981

[54] METHOD OF SCRUBBING ACID GASES FROM GAS MIXTURES

[75] Inventors: Eberhard Lassmann, Herrnhausen; Peter Köhler, Siegertsbrunn; Franz Beran; Hans J. Gerhards, both of Munich, all of Fed. Rep. of Germany

[73] Assignee: Linde Aktiengesellschaft, Wiesbaden, Fed. Rep. of Germany

[21] Appl. No.: 73,801

[22] Filed: Sep. 10, 1979

[30] Foreign Application Priority Data

Sep. 11, 1978 [DE] Fed. Rep. of Germany ....... 2839506

[51] Int. Cl.³ .............................................. C01B 17/16
[52] U.S. Cl. ........................................ 423/228; 55/48; 55/54; 55/68; 55/73
[58] Field of Search ......................... 55/68, 73, 48, 54; 423/228, 229, 243

[56] References Cited

U.S. PATENT DOCUMENTS

| Re. 18,958 | 9/1933 | Bottoms | 423/288 |
| 3,653,810 | 4/1972 | Bratzler | 55/68 |
| 4,094,957 | 6/1978 | Sartori et al. | 423/288 |

FOREIGN PATENT DOCUMENTS

1951751 5/1970 Fed. Rep. of Germany .

OTHER PUBLICATIONS

Butwell et al.—Corrosion Control in $CO_2$ Removal Systems—Chem. Engr. Progress, vol. 69, No. 2, Feb. 73, pp. 57–61.

*Primary Examiner*—Bernard Nozick
*Attorney, Agent, or Firm*—Karl F. Ross

[57] ABSTRACT

A process for scrubbing acid gases, especially carbon dioxide, from gas mixtures with an aqueous amine solution serving as the scrubbing liquid in which hexamethylene diamine serves as the amine. The concentration of the hexamethylene diamine in the aqueous solution is 5 to 40% by weight, preferably 25 to 35% by weight.

7 Claims, 2 Drawing Figures

METHOD OF SCRUBBING ACID GASES FROM GAS MIXTURES

FIELD OF THE INVENTION

The present invention relates to a method of scrubbing acid gases, especially carbon dioxide, from gas mixtures containing same and, more particularly, for scrubbing gas mixtures derived from the cracking of hydrocarbons, coal gasification or synthesis-gas production with scrubbing liquids containing amines.

BACKGROUND OF THE INVENTION

It is known to scrub acid gases, especially carbon dioxide, hydrogen sulfide or other compounds such as carbon-oxy sulfides, with aqueous solutions of amines.

In German patent document No. 19 517 51, for example, a number of different compounds from the amine class have been described for this purpose. The amines are used in an aqueous solution for the scrubbing of such acid components from pyrolysis (cracking) gases.

Amont the amines used for this purpose are monoethanol amine and ethylene diamine.

The use of such scrubbing liquids is not limited to the cleaning of pyrolysis gases but can also be applied in a number of other technological fields and to gas mixtures generated therein, especially coal-gasification gases and synthesis gases.

In the selection of a scrubbing liquid for acid gases, various parameters must be considered. For example, each amine solution has a maximum absorption capacity, absorption velocity, regeneratability and corrosivity. Furthermore, one must also consider the selectivity with respect to the components to be scrubbed from the gas mixture and the chemical stability of the active components.

In each process, therefore, within the boundary conditions, there is generally a compromise between and among these various parameters.

None of the known scrubbing liquids is optimal for all of these parameters and in all of these aspects. As a result, the selection of the active agent in this scrubbing liquid is usually as a result of a compromise or a choice depending upon which of the parameters are most important to optimize. Generally the active agent of the scrubbing liquid is selected based upon tests for the particular gas mixture concerned and the environment in which the scrubbing is to occur.

A particularly significant problem in the scrubbing of acid gases from gas mixtures containing same is the problem of corrosion of the apparatus which generally consists of steel.

A reduction in the corrosivity of the scrubbing liquid can decrease the cost of the apparatus by avoiding the need for expensive corrosion-resistant steels and reduce the replacement costs by increasing the apparatus life.

In *Chemical Engineering Progress*, volume 69, No. 2, February 1973, pp 57-61, a number of investigations are described for inhibiting the corrosion of the system monoethanol amine-water-carbon dioxide-steel. In this publication, a three-component inhibitor system referred to as "amine guard" is found to be the best. Because such corrosion inhibitors permit ordinary steels to be used in place of corrosion-resistant steels, their use does not pose an insurmountable cost factor. However, a constant chemical control of the composition of the scrubbing liquid is required when inhibitors are used and losses of the inhibiting components must be continuously monitored and replaced.

Another important consideration in such scrubbing liquids is the absorptive capacity of the active ingredient of the scrubbing liquid since an increased absorptive capacity means that a reduced volume of scrubbing liquid can be employed. This reduction in the throughput of the scrubbing liquid can allow a reduction in the associated apparatus components, especially the components of the scrubbing-liquid circulating path, for example, the heat exchangers, and a reduction in the pumping energy. Both the operating and capital cost of the system can therefore be reduced.

OBJECT OF THE INVENTION

It is the principal object of the present invention to provide a process for the scrubbing of acid gases, especially carbon dioxide, from gas mixtures in which the corrosion problem is reduced or eliminated and the quantity of scrubbing liquid which must be circulated is reduced.

DESCRIPTION OF THE INVENTION

This object and other which will become apparent hereinafter are attained, in accordance with the present invention by a scrubbing method in which an aqueous amine solution is used and the amine is hexamethylene diamine.

Comparative tests against monoethanol amine and ethylene diamine have shown that hexamethylene diamine has significant advantages with respect to corrosion and, especially with respect to monoethanol amine, is advantageous in that it can be charged to a greater extent with the carbon dioxide while being far more easily regenerated. By comparison with ethylene diamine, the hexamethylene diamine scrubbing liquid has a reduced corrosion characteristic and is far more readily regenerated.

Preferably, the concentration of the hexamethylene diamine in the aqueous scrubbing solution of the present invention is 5 to 40% by weight with best results at 25 to 35% by weight.

The present invention is not applicable only to the scrubbing of carbon dioxide from gas mixtures but also can be used for the scrubbing of other acid components, especially hydrogen sulfide, carbonyl sulfide and sulfur-containing organic compounds from gas mixtures containing same.

The surprising results with hexamethylene diamine (HMDA) relative to monoethanol amine (MEA) and ethylene diamine (EDA) as to the corrosion characteristics will be apparent from the following table:

| Concentration Of Aqueous Solution | CORROSION VELOCITY v IN mm/yr | | | | | |
|---|---|---|---|---|---|---|
| | MEA | | EDA | | HMDA | |
| | Day | v | Day | v | Day | v |
| 15 WT-% | 6 | 0.004 | 7 | 1.772 | 7 | 0.003 |
| | 13 | 0.001 | 14 | 0.923 | 14 | −0.001 |
| | 20 | −0.002 | 19 | 0.863 | 27 | −0.005 |
| 40 WT-% | 6 | 0.388 | 7 | 8.591 | 7 | −0.002 |
| | 13 | 0.500 | 14 | 5.200 | 14 | −0.002 |
| | 20 | 0.524 | 19 | 3.582 | 27 | −0.008 |

From the tabulated results it will be apparent that an aqueous solution of the several amines at two different concentrations was tested. In each case, equally long strips of carbon steel (RR St 1404 M) were immersed for long periods, measured in days, at a temperature of about 100° C. in the respective amine solutions through which carbon dioxide was bubbled so that the solution was maintained saturated with this gas. The weight change of the metal strips was used to calculate the corrosion velocity v given in mm/yr, corresponding to the thickness change of the strip surface resulting from removal, extrapolated to a year. The negative results were interpreted as the development of a protective layer upon the strips.

The results obtained with the hexamethylene diamine and with the 15 weight % monoethanol amine solutions showed small values for v which were within the limits of the measuring precision and were interpreted as indicating a total absence of corrosion effects. The measurement temperature of about 100° C. corresponded to the temperatures used at the high temperature end of the regenerator column and the high temperature end of the heat exchanger usually provided upstream of this column, at which the greatest corrosion has been experienced heretofore.

From the table it is apparent that the hexamethylene diamine over the entire range of tests had no corrosive effects. The ethylene diamine had strongly corrosive characteristics and was significantly poorer at both concentrations than the hexamethylene diamine. While the 15% solution of the monoethanol amine and the hexamethylene diamine solutions had comparatively the same corrosion-excluding characteristics, when the 40% solution of hexamethylene diamine is compared with the corresponding solution of monoethanol amine, a significant improvement in corrosion resistance can be noted.

Further test results will be apparent from the accompanying drawing.

SPECIFIC DESCRIPTION

Figure 1:
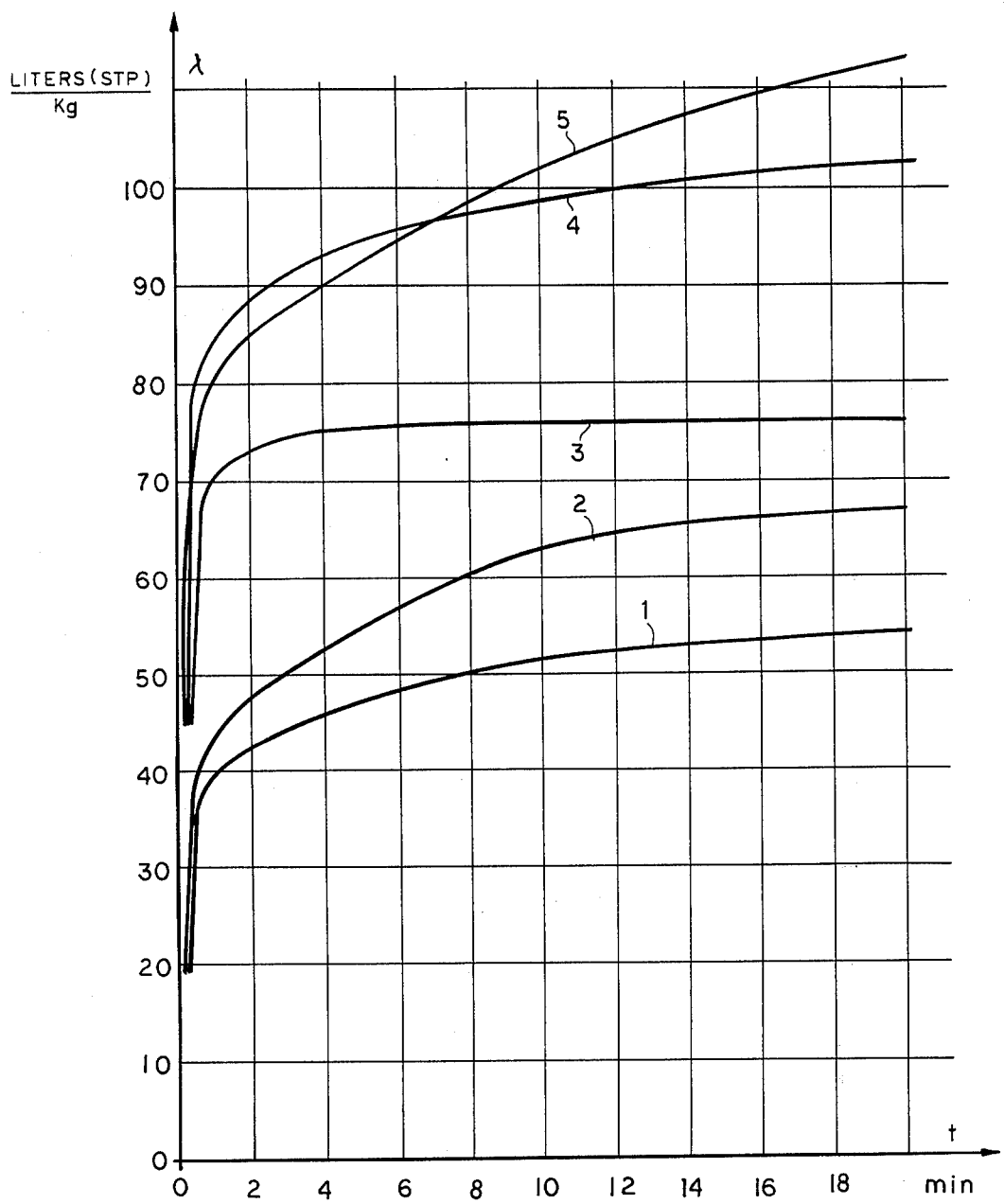
FIG. 1 is a graph showing the carbon dioxide takeup of three amine solutions in dependence upon time, thereby representing the velocity of absorption of acid gases.

From the diagram of FIG. 1, which represents tests carried out at 25° C. in a shaker apparatus, the carbon dioxide partial pressure in the gas phase was approximately one bar. The solubility of carbon dioxide in liters at standard temperature and pressure per kg of solution is plotted along the ordinate while the time t in minutes is plotted along the abscissa.

The curves 1, 2 and 3 represent 20 weight % aqueous solutions of monoethanol amine, hexamethylene diamine and ethylene diamine, respectively. Curve 4 represents a 40 weight % aqueous solution of monoethanol amine and curve 5 a 35 weight % of hexamethylene diamine.

The curves show that the equilibrium loading of the scrubbing liquid with hexamethylene diamine, by comparison to the other amines, is significantly later.

With ethylene diamine the equilibrium loading occurs relatively quickly and a comparison of the loading values after about 5 minutes corresponding to the residence time in a scrubbing column, shows that the carbon dioxide takeup with 20 weight % hexamethylene diamine is about 15% higher than with monoethanol amine at the same concentration. Between the 35 weight % hexamethylene diamine solution and the 40 weight % monoethanol amine solution there is only a small difference, thereby indicating that a 40% hexamethylene diamine solution would have a significantly higher takeup than the monoethanol amine at the same concentration in the aqueous solution. A comparison of the 20 weight % solutions of the monoethanol amine and the hexamethylene diamine with the 20 weight % ethylene diamine solution shows the latter with a higher pickup of the carbon dioxide although it must be noted, with respect to this point, that higher concentrations of ethylene diamine are practically unusable because of their high corrosivity and the need for expensive corrosion inhibitors if they are to be utilized.

The hexamethylene diamine, taken as a whole, therefore, has significant advantages over both the ethylene diamine and the monoethanol amine.

Figure 2:
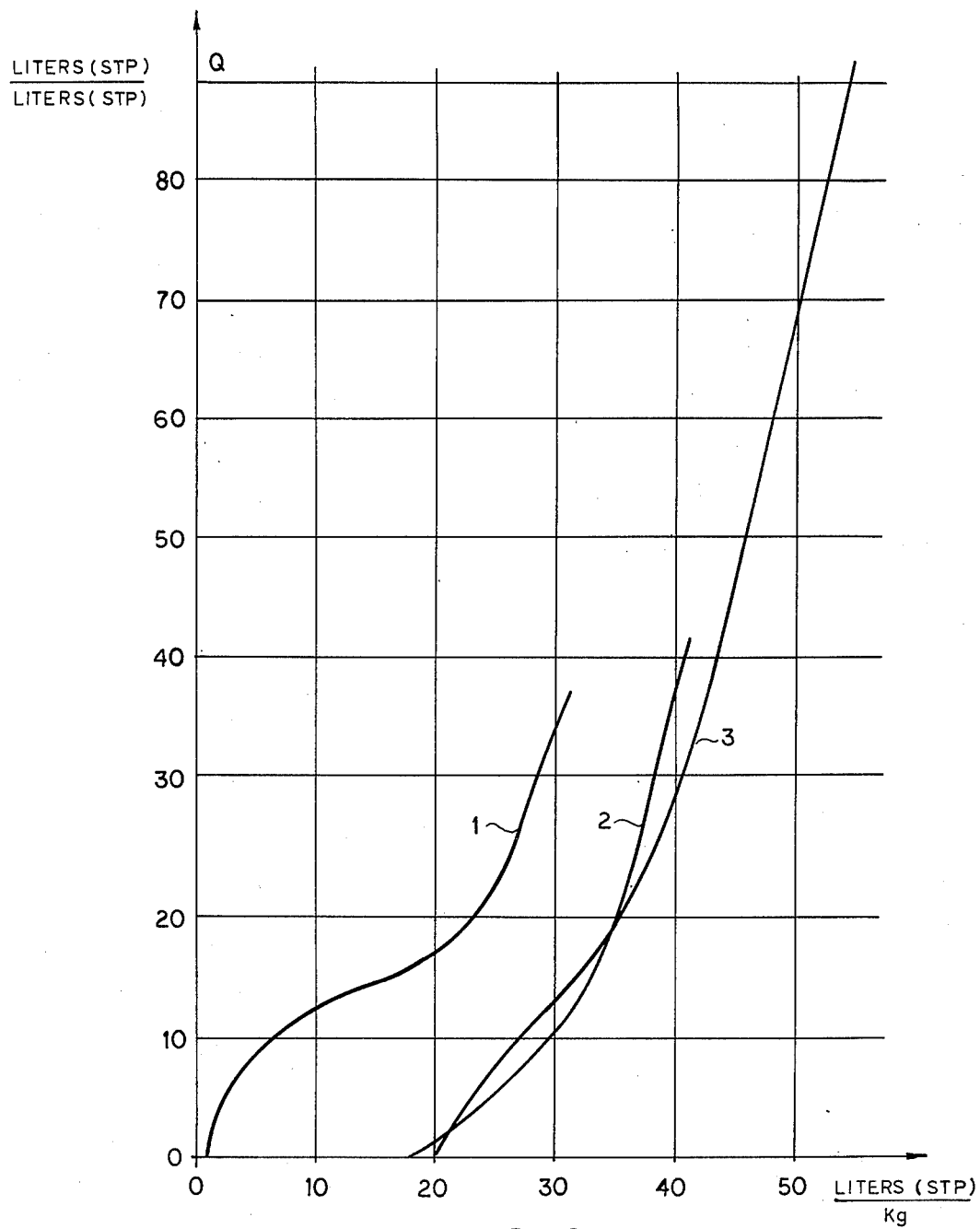
FIG. 2 is a graph showing the stripping vapor requirements for three comparative amine solutions in dependence upon the carbon dioxide volume recovered from the amine solutions.

FIG. 2 shows a series of tests with the 20 weight % aqueous solutions previously mentioned. The solutions were charged at a temperature of 50° C. and a carbon dioxide partial pressure of about 1 bar to 85% of the equilibrium loading of the scrubbing solutions with the carbon dioxide. Thereafter the solutions were heated to about 100° C. and steam was introduced at the same temperature. The regenerating vessel, unlike the usual regenerators in a scrubbing liquid cycle, was a simple receptacle without packing or trays. The stripping steam quantity was measured at the outlet of the vessel.

The integral stripping steam requirement Q is plotted along the ordinate in FIG. 2 in liters at standard temperature and pressure of steam per liter at standard temperature and pressure of carbon dioxide driven out of the scrubbing liquid. The abscissa plots the carbon dioxide volume V driven out of the solution per kg of solution, the volume V being given in standard liters.

Curve 1 shows the results obtained with monoethanol amine, curve 2 with hexamethylene diamine and curve 3 with ethylene diamine. The ends of the curves 1 and 2 represent a condition in which the residual loading of carbon dioxide in the scrubbing liquid was 10 standard liters per kg of the solution. This corresponds to the results normally obtained with amine scrubbing.

The starting points of the curves along the abscissa represent the original carbon dioxide volume release occurring by the simple heating of the solutions to the stripping temperature.

A comparison of the curves at an abscissa value of 31 standard liters per kg shows the following results. With monoethanol amine, only 1 standard liter of carbon dioxide is driven off by the simple heating to the regenerating temperature and the residual 30 standard liters requires stripping steam. This corresponds to 37 standard liters of steam per standard liter of carbon dioxide and a total of about 1150 standard liters of steam.

In a corresponding test, both the hexamethylene diamine solution and the ethylene diamine solution require substantially less tripping steam to set free the same carbon dioxide volume. Thus, curve 2 shows that 18 standard liters of carbon dioxide per kg of solution are released simply by heating the hexamethylene diamine solution to the stripping temperature and stripping steam is only necessary for the remaining 13 standard liters of carbon dioxide. In an average value, 12 standard liters of steam per standard liter of carbon dioxide are required, corresponding to a total of 370 standard liters of stripping steam. The monoethanol amine thus requires approximately three times as much stripping steam. From curve 3 it will be apparent that the total stripping steam required for the ethylene diamine solution is 435 standard liters of steam per kg of solution with about 20 standard liters of carbon dioxide being driven off by simple heating and the residual 11 standard liters of carbon dioxide being expelled by the stripping steam.

It should be apparent from the foregoing discussion that the amine solutions were all brought to the same degree of loading and in terms of 85% of its equilibrium loading, so that the solution contains, after regeneration, a residual carbon dioxide content of 10 standard liters per kg of scrubbing liquid in the case of monoethanol amine, of 34 standard liters per kg in the case of ethylene diamine, and of 20 standard liters per kg in the case of the hexamethylene diamine.

The takeup of the monoethanol amine solution is thus optimally utilized at the cost of an extremely high stripping-steam requirement so that the one-third lower requirement of the hexamethylene diamine indicates that this is a far superior scrubbing solution.

If one considers a parallel to the abscissa at a value of about 37 standard liters of steam per standard liter of carbon dioxide, the disadvantages of the monoethanol amine solution will also be apparent: per kg of the scrubbing liquid, only 31 standard liters of carbon dioxide are driven off by comparison with 40 standard liters for the hexamethylene diamine and 43 standard liters for the ethylene diamine. While, to this extent, the hexamethylene diamine is less effective than the ethylene diamine, it is nevertheless advantageous thereover since its capacity for carbon dioxide is better utilized. The residual loading for the hexamethylene diamine is only about 11 standard liters of carbon dioxide per kg of scrubbing liquid as contrasted with 10 standard liters for the monoethanol amine solution and 22 standard liters for the ethylene diamine solution.

For otherwise comparable scrubbing liquid quantities, in the region in FIG. 2 between 22 and 35 standard liters of carbon dioxide driven off per kg of scrubbing liquid, the hexamethylene diamine is significantly of advantage, especially because of the reduced stripping steam requirement. In the region about 35 standard liters of carbon dioxide driven off per kg of scrubbing liquid, ethylene diamine has an advantage since more carbon dioxide can be expelled which is of advantage in the cleaning of large quantities of crude gas. However, the hexamethylene diamine has a significant advantage with respect to the quantity which must be recirculated through the system and, when considered with the low corrosion characteristics, this represents a clear advantage in the case of the hexamethylene diamine.

The hexamethylene diamine was substituted for the monoethanol amine and ethylene diamine in the system of the aforedescribed German publication and was found to be fully effective with differences from these known amine solutions in the manner described above. The useful life of the apparatus, however, was markedly increased by comparison with systems in which high concentrations of amine in the scrubbing liquid were provided and the monoethanol amine and ethylene diamine were used. The hexamethylene diamine was found to be fully effective for all of the stripping carried out in this technique.

We claim:

1. A method of scrubbing an acid gas selected from the group consisting of carbon dioxide and a sulfur containing gas from a gas mixture which comprises the step of treating the gas mixture with an aqueous scrubbing solution consisting of 5 to 40% hexamethylene diamine and balance water at a temperature enabling the scrubbing solution to absorb said acid gas from the gas mixture.

2. The method defined in claim 1 wherein the concentration of the hexamethylene diamine in the aqueous solution is 25 to 35% by weight.

3. The method defined in claim 2 wherein the temperature is about 50° C.

4. The method defined in claim 3, further comprising the step of stripping the scrubbing solution with steam and recycling the scrubbing solution to contact with additional quantities of the gas mixture.

5. The method defined in claim 4 wherein the gas mixture is a cracking gas from the pyrolytic treatment of a hydrocarbon.

6. The method defined in claim 4 wherein the gas mixture is a coal-gasification mixture.

7. The method defined in claim 4 wherein the gas mixture is a synthesis gas.

* * * * *